US012636764B2

(12) United States Patent
Kollmann

(10) Patent No.: US 12,636,764 B2
(45) Date of Patent: May 26, 2026

(54) POWER TOOL

(71) Applicant: MILWAUKEE ELECTRIC TOOL CORPORATION, Brookfield, WI (US)

(72) Inventor: Hunter T. Kollmann, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/802,128

(22) Filed: Aug. 13, 2024

(65) Prior Publication Data

US 2025/0058445 A1 Feb. 20, 2025

Related U.S. Application Data

(60) Provisional application No. 63/618,425, filed on Jan. 8, 2024, provisional application No. 63/520,242, filed on Aug. 17, 2023.

(51) Int. Cl.

| | |
|---|---|
| ***B25C 1/04*** | (2006.01) |
| ***B25C 1/06*** | (2006.01) |
| ***B25D 16/00*** | (2006.01) |
| ***B25D 17/06*** | (2006.01) |

(52) U.S. Cl.

CPC ................ *B25C 1/047* (2013.01); *B25C 1/06* (2013.01); *B25D 16/006* (2013.01); *B25D 17/06* (2013.01); *B25D 2250/181* (2013.01)

(58) Field of Classification Search

None

See application file for complete search history.

(56) References Cited

U.S. PATENT DOCUMENTS

| | | | | |
|---|---|---|---|---|
| 3,042,004 A | | 7/1962 | Fischer et al. | |
| 3,067,584 A | * | 12/1962 | Atkinson ............... | B25D 17/06 92/84 |
| 3,351,256 A | | 11/1967 | Readyhough | |
| 3,467,294 A | | 9/1969 | Fisher | |
| 3,572,211 A | | 3/1971 | Doyle | |
| 4,173,171 A | * | 11/1979 | Lange ..................... | B25C 1/041 91/416 |

(Continued)

FOREIGN PATENT DOCUMENTS

| | | |
|---|---|---|
| EP | 3332916 A2 | 6/2018 |

*Primary Examiner* — Tanzim Imam

(74) *Attorney, Agent, or Firm* — Michael Best & Friedrich LLP

(57) ABSTRACT

A powered fastener driver includes a housing defining a cylinder support portion and a motor housing portion, a cylinder within the cylinder support portion, and a piston movable within the cylinder. The piston is moveable from a top-dead-center (TDC) position to a bottom-dead-center (BDC) position along a driving axis. A stroke length is measured between the TDC position and the BDC position along the driving axis. The fastener driver also includes a driver blade attached to the piston for movement along the driving axis from the TDC position toward the BDC position for driving a fastener into a workpiece. The fastener driver includes a lifter operable to move the piston and driver blade, in unison, from the BDC position toward the TDC position. The piston includes a first seal and a second seal located at a distance of at least the stroke length from the first seal.

20 Claims, 11 Drawing Sheets

(56) References Cited

U.S. PATENT DOCUMENTS

| | | | | | |
|---|---|---|---|---|---|
| 4,186,862 | A * | 2/1980 | Klaus | B25C 1/04 | 227/156 |
| 4,188,858 | A * | 2/1980 | Plunkett | B25C 1/008 | 91/402 |
| 4,206,687 | A | 6/1980 | Klaus et al. | | |
| 4,252,261 | A * | 2/1981 | Klaus | B25C 1/041 | 91/402 |
| 4,344,555 | A | 8/1982 | Wolfberg | | |
| 4,610,381 | A * | 9/1986 | Kramer | B25C 1/005 | 91/271 |
| 5,954,140 | A * | 9/1999 | Bauer | B25D 16/00 | 173/114 |
| 6,123,243 | A | 9/2000 | Pfister et al. | | |
| 7,032,683 | B2 * | 4/2006 | Hetcher | B25D 17/088 | 173/210 |
| 7,575,139 | B2 | 8/2009 | Thompson | | |
| 7,975,777 | B2 | 7/2011 | Krondorfer et al. | | |
| 8,016,046 | B2 | 9/2011 | Zhao et al. | | |
| 8,636,081 | B2 * | 1/2014 | Ludy | B25D 11/005 | 173/217 |
| 9,844,864 | B2 | 12/2017 | Zhao et al. | | |
| 10,160,107 | B2 | 12/2018 | Yang et al. | | |
| 11,242,873 | B2 | 2/2022 | Moodie | | |
| 11,413,734 | B2 | 8/2022 | Bradley et al. | | |
| 2021/0299835 | A1 * | 9/2021 | Ward | B25C 1/06 | |
| 2021/0308853 | A1 * | 10/2021 | Ebner | B25D 17/08 | |
| 2022/0371167 | A1 | 11/2022 | Bradley et al. | | |

* cited by examiner

POWER TOOL

CROSS-REFERENCE TO RELATED APPLICATIONS

This application claims priority to U.S. Provisional Patent Application No. 63/618,425, filed Jan. 8, 2024, and U.S. Provisional Patent Application No. 63/520,242, filed Aug. 17, 2023, the entire contents of both of which are incorporated herein by reference.

FIELD OF THE INVENTION

The present invention relates to cordless power tools, and more particularly to powered fastener drivers and impact power tools.

BACKGROUND OF THE INVENTION

Powered fastener drivers and impact power tools utilize pistons that reciprocate within a cylinder or a spindle.

SUMMARY OF THE INVENTION

The present invention provides, in one aspect, a powered fastener driver including a housing defining a cylinder support portion and a motor housing portion. The powered fastener driver includes a cylinder within the cylinder support portion and a piston movable within the cylinder. The piston is moveable from a top-dead-center (TDC) position to a bottom-dead-center (BDC) position along a driving axis. A stroke length is measured between the TDC position and the BDC position on the driving axis. The powered fastener driver includes a driver blade attached to the piston for movement along the driving axis from the TDC position toward the BDC position for driving a fastener into a workpiece. The powered fastener driver includes a lifter operable to move the piston and driver blade, in unison, from the BDC position toward the TDC position. The piston includes an axial length of at least the stroke length. The piston includes a first seal and a second seal located at a distance of at least the stroke length from the first seal.

The present invention provides, in yet another aspect, a powered fastener driver including a housing defining a cylinder support portion and a motor housing portion and a cylinder within the cylinder support portion. The powered fastener driver includes a driver assembly configured to drive a fastener into a workpiece. The driver assembly includes a piston movable within the cylinder from a top-dead-center (TDC) position to a bottom-dead-center (BDC) position along a driving axis, thereby defining a stroke length measured between the TDC position and the BDC position on the driving axis. The driver assembly includes a driver blade attached to the piston for movement therewith along the driving axis from the TDC position toward the BDC position for driving a fastener into a workpiece. The powered fastener driver includes a lifter operable to move the assembly from the BDC position toward the TDC position. The powered fastener driver includes a first seal coupled to a first location on the driver assembly and a second seal coupled to a second location on the driver assembly. The second seal is located at a distance of at least the stroke length from the first seal.

The present invention provides, in yet another aspect, an impact power tool adapted to impart axial impacts to a tool bit. The impact power tool includes a housing, a motor supported by the housing and a spindle coupled to the motor.

The spindle receives torque from the motor to cause the spindle to rotate. The impact power tool includes a reciprocating impact mechanism that is operable to create a variable pressure air spring within the spindle. The impact mechanism includes a striker received within the spindle that reciprocates along a reciprocation axis in response to the variable pressure air spring. The impact mechanism incudes a piston that reciprocates along the reciprocation axis to induce the variable pressure air spring. The piston is movable within the spindle from a top-dead-center (TDC) position to a bottom-dead-center (BDC) position along the reciprocation axis. A stroke length is measured between the TDC position and the BDC position along the reciprocation axis. The piston includes a first seal and a second seal located at a distance of at least the stroke length from the first seal.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
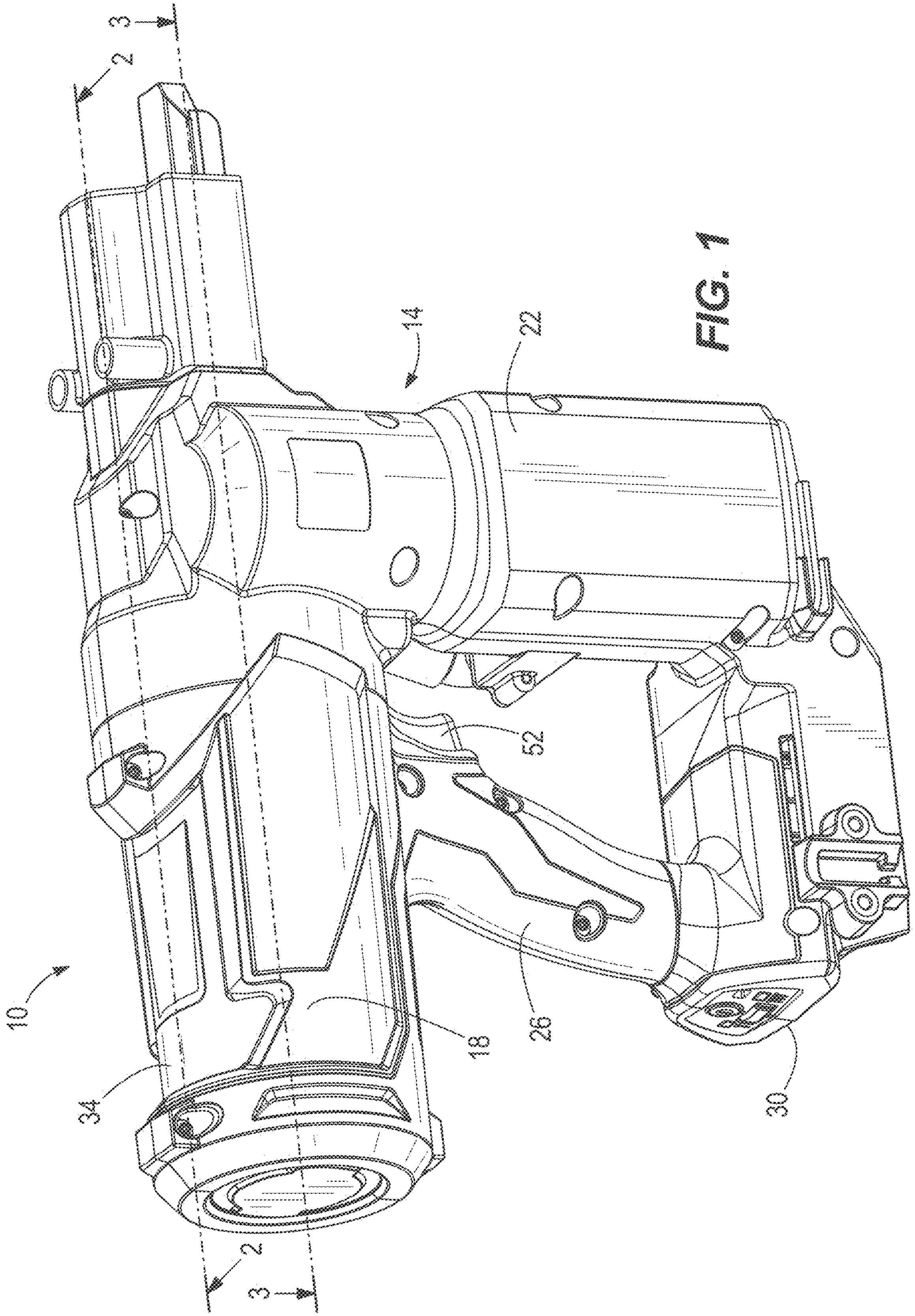
FIG. 1 is an isometric view of a powered fastener driver.

FIG. 1 illustrates a gas spring-powered fastener driver 10 operable to drive fasteners (e.g., nails, tacks, staples, etc.) into a workpiece. The fastener driver 10 includes a housing 14 having a cylinder support portion 18, a motor housing portion 22 extending transversely from a bottom end of the cylinder support portion 18, and a handle portion 26 extending away from a middle of the cylinder support portion 18. The housing 14 further includes a battery receptacle 30 configured to receive a battery pack (not shown).

The battery pack may be an 18-volt rechargeable power tool battery pack. The battery pack may include multiple battery cells having, for example, a lithium (Li), lithium-ion (Li-ion), or other lithium-based chemistry. For example, the battery cells may have a chemistry of lithium-cobalt (Li—Co), lithium-manganese (Li—Mn) spinel, or Li—Mn nickel. In such embodiments, each battery cell may have a nominal voltage of about, for example, 3.6V, 4.0V, or 4.2V. In other embodiments, the battery cells may have a nickel-cadmium, nickel-metal hydride, or lead acid battery chemistry. In further embodiments, the battery pack may include fewer or more battery cells, and/or the battery cells may have a different nominal voltage. In yet another embodiment, the battery pack may be a dedicated battery housed (partially or entirely) within the fastener driver 10. The battery pack may also be configured for use with other cordless power tools, such as drills, screwdrivers, grinders, wrenches, and saws.

Figure 2:
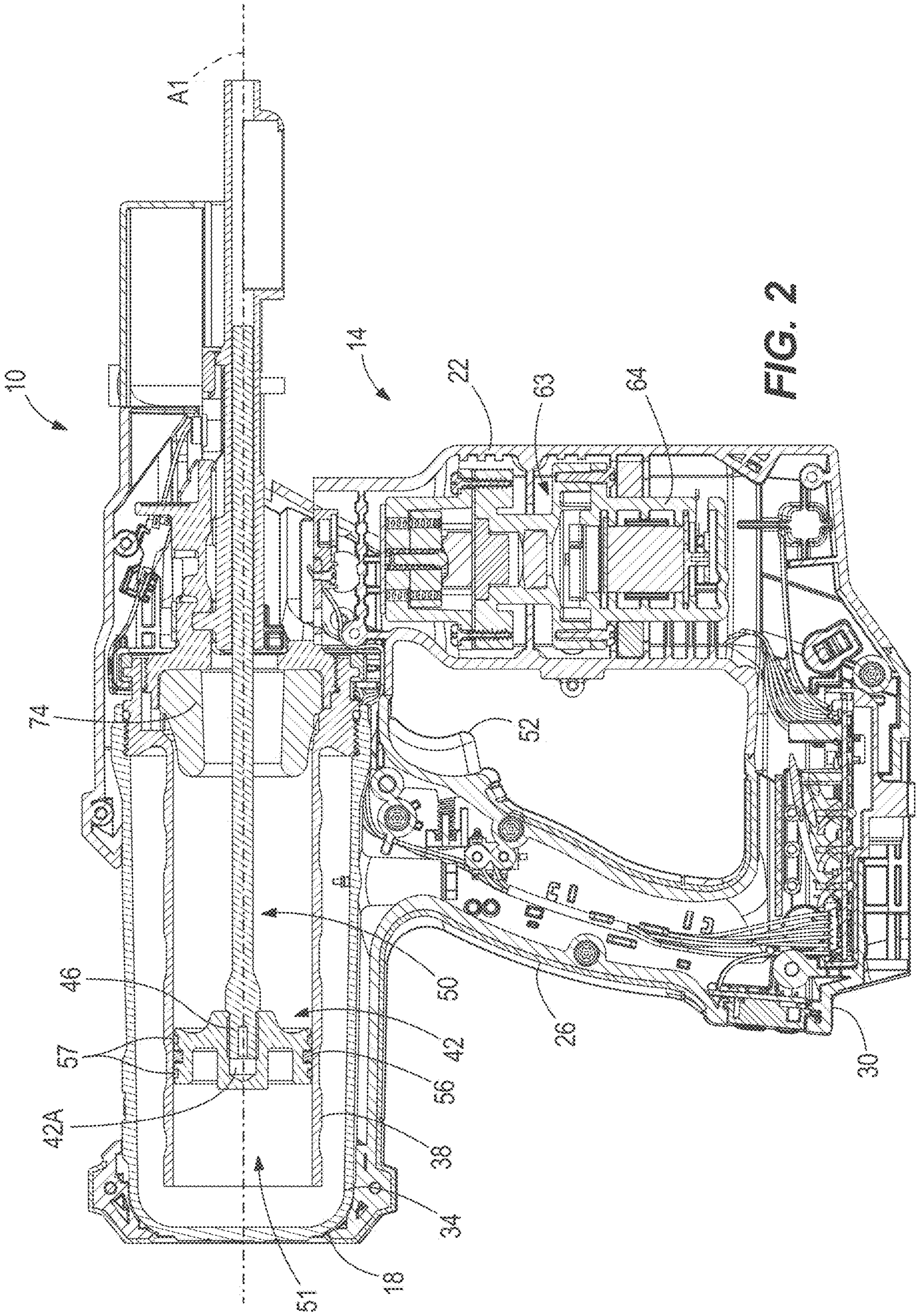
FIG. 2 is a cross-sectional view of the powered fastener driver of FIG. 1, taken along section 2-2 in FIG. 1.
Figure 3:
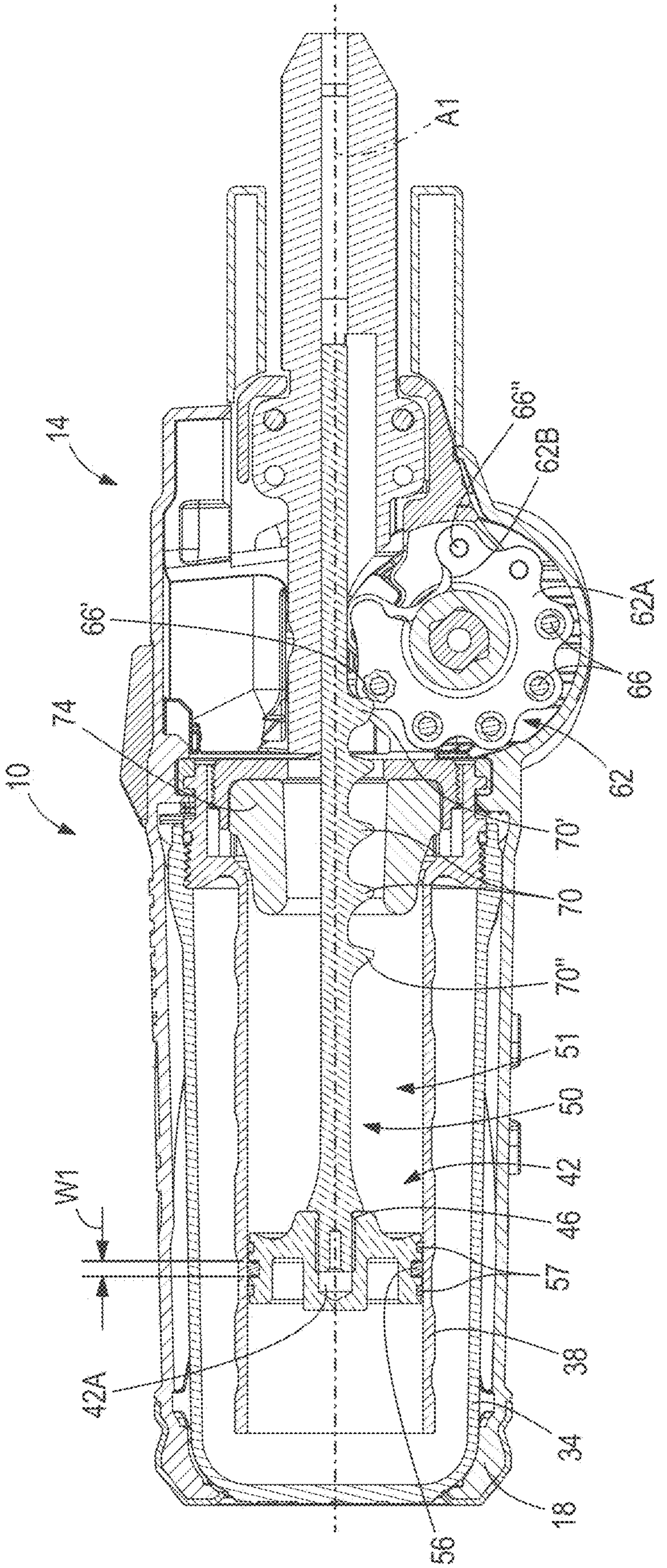
FIG. 3 is a cross-sectional view of the powered fastener driver of FIG. 1, taken along section 3-3 in FIG. 1.

With reference to FIGS. 2 and 3, the fastener driver 10 includes an outer storage chamber cylinder 34 within the cylinder support portion 18 of the housing 14. The fastener driver 10 includes an inner cylinder 38 within the storage chamber cylinder 34. The inner cylinder 38 supports a moveable piston 42 positioned within the cylinder 38. The piston 42 includes a threaded aperture 42A that extends therethrough. The threaded aperture 42A receives a threaded end 46 of a driver blade 50, which moves in unison with the piston 42. In some embodiments, the piston 42 is constructed of a first material (e.g., aluminum) and the driver blade 50 is constructed from a second material (e.g., steel). In other embodiments, the piston 42 may be constructed from other metals or materials. In some embodiments, the combination of the piston 42 and the driver blade 50 is considered a driver mechanism 51 that reciprocates as a unit within the inner cylinder 38.

The fastener driver 10 does not require an external source of air pressure, but rather the storage chamber cylinder 34 includes pressurized gas in fluid communication with the cylinder 38. The cylinder 38, the piston 42, and the driver blade 50 define a driving axis A1. During a driving cycle, the piston 42 and driver blade 50 are moveable between a top-dead-center (TDC) position and a driven or bottom-dead-center (BDC) position. The piston 42 includes a seal 56 (e.g., a quad ring, a non-sealing O-ring, felt, a square cut ring) to seal the pressurized gas within the storage chamber cylinder 34. In some embodiments, the seal 56 is an annular seal 56 that extends around the entire circumference of the piston 42 and that contacts the entire inner dimeter of the cylinder 38. In other words, the seal 56 extends 360 degrees around the piston 42. In some embodiments, the seal 56 is lubricated with an incompressible fluid (e.g., oil) to decrease friction between the seal 56 and the surface of the inner cylinder 38. With reference to FIG. 3, the seal 56 is configured as a quad ring having a width WI that is approximately 3 millimeters and is made from an elastomeric material (e.g., nitrile or neoprene). The seal 56 is axially flanked along the axis A1 by guide rings 57, which center the piston 42 within the inner cylinder 38 and ensure that it reciprocates along the axis A1 between the TDC and BDC positions.

With continued reference to FIGS. 2 and 3, the fastener driver 10 further includes a lifting assembly, which includes a lifter 62 that is rotated by an electric motor 63 and that moves the driver blade 50 from the BDC position toward the TDC position. The motor 63 includes a motor housing 64 supported in the housing 14 of the fastener driver 10. In some embodiments, a transmission (not shown) provides torque to the lifter 62 from the motor 63. The transmission may be a planetary transmission with a single-stage or a multi-stage planetary transmission including any number of planetary gear stages. The lifter 62 is formed by two plates 62A, 62B and includes multiple drive members 66 extending between the plates 62A, 62B. The drive members 66 are sequentially engageable with corresponding teeth 70 on the driver blade 50 to raise the driver blade 50 from the BDC position toward the TDC position.

In operation, the lifting assembly drives the piston 42 and the driver blade 50 toward the TDC position by energizing the motor 63. As the piston 42 and the driver blade 50 are driven toward the TDC position, the gas above the piston 42 and the gas within the storage chamber cylinder 34 is compressed. The motor 63 is deactivated and the piston 42 and the driver blade 50 are held in a ready position, which is located near the TDC position, until being released by user activation of a trigger 52. When released, the compressed gas above the piston 42 and within the storage chamber cylinder 34 expands, driving the piston 42 and the driver blade 50 to the driven or BDC position, thereby driving a fastener into the workpiece. The fastener driver 10 therefore operates on a gas spring principle utilizing the lifting assembly and the piston 42 to further compress the gas within the storage chamber cylinder 34.

Prior to initiating a firing cycle, the driver blade 50 is held in the ready position with the piston 42 near the TDC position within the cylinder 38. More specifically, a first drive member 66' on the lifter 62 is engaged with a lowermost tooth 70' of axially spaced lifting teeth 70 on the driver blade 50. When the trigger 52 is pulled to initiate a firing cycle, the motor 63 is activated to rotate the lifter 62 in a counter-clockwise direction from the frame of reference of FIG. 3, thereby displacing the driver blade 50 upward past the ready position a slight amount before the lower-most tooth 70' on the driver blade 50 slips off the first drive member 66' (at the TDC position of the driver blade 50). Thereafter, the piston 42 and the driver blade 50 are thrust downward toward the driven or BDC position by the expanding gas in the cylinder 38 and storage chamber cylinder 34. As the driver blade 50 is displaced toward the driven position, the motor 63 remains activated to continue counter-clockwise rotation of the lifter 62.

Upon a fastener being driven into a workpiece, the piston 42 impacts a bumper 74 to quickly decelerate the piston 42 and the driver blade 50, eventually stopping the piston 42 in the driven position. The bumper 74 is configured to distribute the impact force of the piston 42 uniformly throughout the bumper 74 as the piston 42 is rapidly decelerated upon reaching the driven position. The bumper 74 may be formed from any suitable elastic material (e.g., rubber). Shortly after the driver blade 50 reaches the driven or BDC position, a first drive member 66" engages the uppermost lifting tooth 70" on the driver blade 50 and continued counter-clockwise rotation of the lifter 62 raises the driver blade 50 and the piston 42 toward the ready position for another firing cycle.

Figure 4:
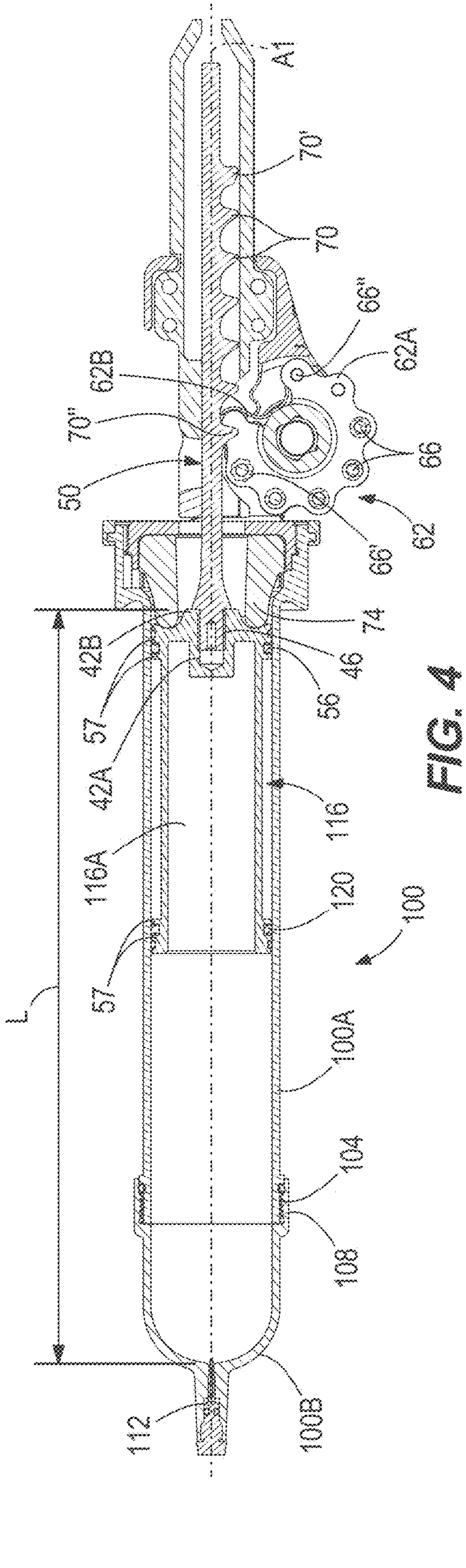
FIG. 4 is a cross-sectional view of a gas spring power mechanism, in accordance with an embodiment of the invention.

FIG. 4 illustrates a gas spring power mechanism that is compatible with the fastener driver 10 of FIGS. 1-3. The gas spring power mechanism of FIG. 4 is like the gas spring power mechanism as disclosed in FIGS. 2 and 3. Therefore, only differences between the gas spring power mechanisms will be discussed. The gas spring power mechanism of FIG. 4 includes an elongated cylinder 100 having a driving portion 100A and a storage portion 100B that are coupled to each other. The driving portion 100A is sized to accommodate a piston with a diameter of 43 millimeters. In some embodiments, the driving portion 100A is sized to accommodate a piston with a diameter of 33 millimeters. In other embodiments, the driving portion 100A is sized to accommodate a piston with a diameter between 33-43 millimeters.

In some embodiments, the elongated cylinder 100 may be formed from two or more tubular components that are joined together in a post-manufacturing process (e.g., friction spin weld, etc.). For instance, the driving portion 100A is a tubular component including a threaded end 104 that is threaded to a corresponding threaded end 108 of the storage portion 100B. The storage portion 100B is a tubular component with a dome-shaped cap disposed on an opposite side of the tubular component relative to the threaded end 108 along the axis A1. An area defined between the driving portion 100A and the storage portion 100B may also support a seal (e.g., an O-ring, felt) to increase scaling near the threads 104, 108 of the driving portion 100A and the storage portion 100B. The storage portion 100B includes a fill valve 112 that is coaxial to the axis A1 through which compressed gas is filled into the cylinder 100.

The cylinder 100 is axially longer than the storage chamber cylinder 34 because it does not include a doubled walled cylinder to hold the compressed gas. Rather, the storage portion 100B is disposed axially adjacent to the driving portion 100A along the axis A1. In contrast, the storage chamber cylinder 34 is radially disposed around the inner cylinder 38 relative to the axis A1 (see FIG. 3). The storage portion 100B functions similarly to the storage chamber cylinder 34 to retain the compressed gas. In some embodiments, the storage portion 100B includes a diameter that is smaller than the driving portion 100A. In some embodiments, the storage portion 100B is configured as a double wall cylinder similar to the storage chamber cylinder 34. In some embodiments, the storage portion 100B is configured in a shape that is different from the driving portion 100A. Specifically, in some embodiments, the storage portion 100B is configured as a rectangular prism that is configured to retain the compressed gas and is in fluid connection with the driving portion 100A. The cylinder 100 supports an elongated piston 116 having an elongated wall portion 116A and a base portion 42B integrally formed with the wall portion 116A. The base portion 42B includes a threaded aperture 42A to receive the threaded end 46 of the driver blade 50. The piston 116, when at the TDC position, remains entirely within the driving portion 100A and does not enter the storage portion 100B, keeping the storage portion 100B open to receive compressed gas while the piston 116 reciprocates between the TDC and BDC positions.

Figure 5A:
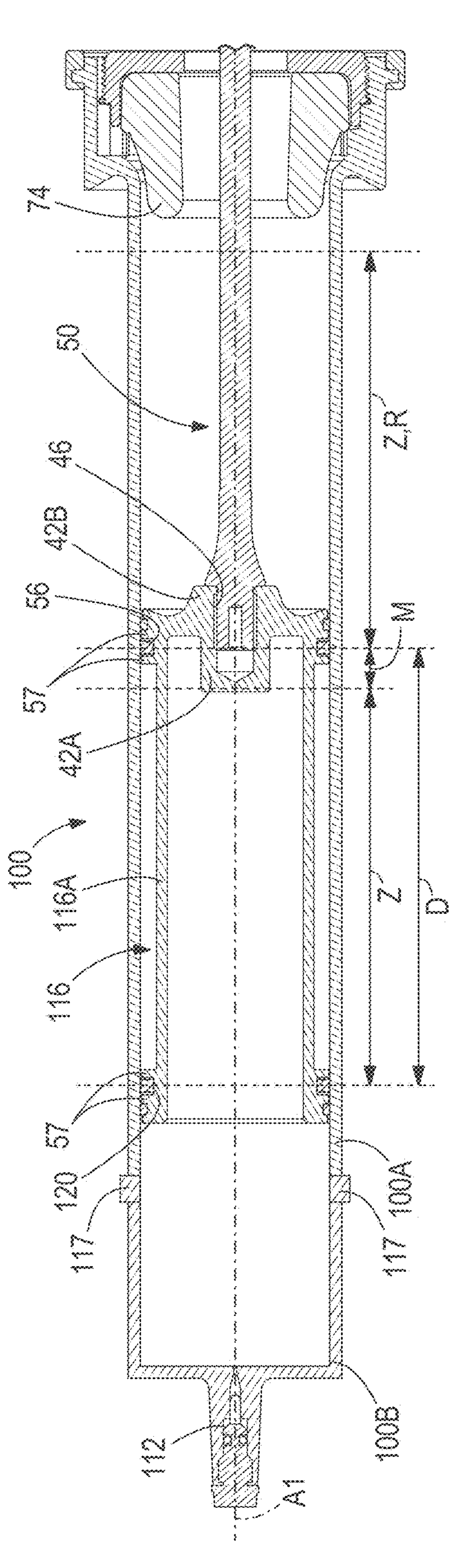
FIG. 5A is a simplified cross-sectional view of the gas spring power mechanism of FIG. 4 at a top-dead-center (TDC) position.
Figure 5B:
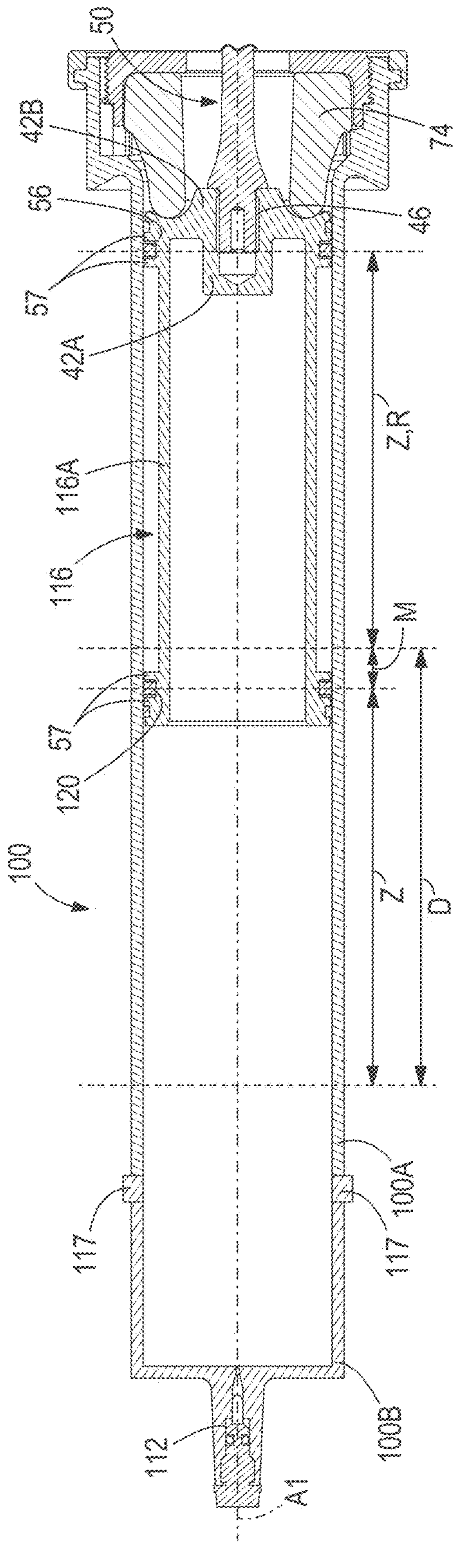
FIG. 5B is a simplified cross-sectional view of the gas spring power mechanism of FIG. 4 at a bottom-dead-center (BDC) position.

FIGS. 5A and 5B illustrate a simplified version of the cylinder 100, with the connection between the driving portion 100A and the storage portion 100B being shown with blocks 117. FIG. 5A illustrates the piston 116 at the TDC position and FIG. 5B illustrates the piston 116 at the BDC position. The distance between the TDC position and the BDC position is referred to as a stroke length Z. In the illustrated embodiment, the stroke length Z is approximately 111 millimeters. In other embodiments, the stroke length Z is greater than or less than 111 millimeters. The cylinder 100 includes a length L measured along the axis A1 (FIG. 4). In some embodiments, the length L of the of the cylinder 100 is double the stroke length such that the length is 222 millimeters. In other words, the length L is at least twice the stroke length Z. More specifically, in some embodiments, the length L is approximately 280 millimeters and stroke length Z is approximately 111 millimeters. In some embodiments, the length of the cylinder 100 is between 222 millimeters and 280 millimeters. A ratio between a length of the cylinder 100 having a length of 222 millimeters and a diameter of the piston 116 being between 33-43 millimeters is approximately between 5.1:1 to 6.7:1. A ratio between a length of the cylinder 100 having a length of 280 millimeters and a diameter of the piston 116 being between 33-43 millimeters is approximately between 6.5:1 to 8.4:1.

Like the piston 42, the piston 116 is movable along the axis A1 between a TDC position and a BDC position. Due to the reciprocating movement of the piston 116, the interior wall of the cylinder 100 may experience scratching within a region R (coinciding with the stroke length Z in FIGS. 5A and 5B) in which the seal 56 reciprocates between the TDC position to the BDC position. As a result, small leak paths may develop between the seal 56 and the cylinder 100 within this region R of the cylinder 100. To prevent this, the piston 116 includes another seal 120 (e.g., a quad ring, a non-sealing O-ring, felt, a square cut ring) located at an axial distance D from the seal 56 (FIG. 5A). In some embodiments, the seal 120 is an annular seal 120 that extends around the entire circumference of the piston 116 and that contacts the entire inner dimeter of the cylinder 100. In other words, the seal 120 extends 360 degrees around the piston 116. In some embodiments, the seal 120 is configured as a quad ring like the quad ring used as the seal 56. In some embodiments, the seal 120 is lubricated with an incompressible fluid (e.g., oil) to decrease friction between the seal 120 and the surface of the cylinder 100. The axial distance D is a sum of the stroke length Z and a margin M. In other words, the axial distance D is equal to the stroke length Z plus the margin M. A reference point for the stroke length Z is the center of the seals 56, 120 from the TDC position to the BDC position. In the illustrated embodiment, the margin M is approximately 10 millimeters. In other embodiments, the margin M is equivalent to a width of the seal 56. In other embodiments, the margin is between 8 and 12 millimeters, between 6 and 14 millimeters, between 4 and 16 millimeters, or between 2 and 18 millimeters. The margin M ensures that the seals 56, 120 do not axially overlap along the axis A1 when translating from the TDC position to the BDC position. Because the seal 120 does not axially overlap with the region R in the cylinder 100, the seal 120 will remain outside the region R of the cylinder 100 in which scratches may form, reducing or preventing the likelihood that small leak paths develop between the seal 120 and the cylinder 100.

Figure 6:
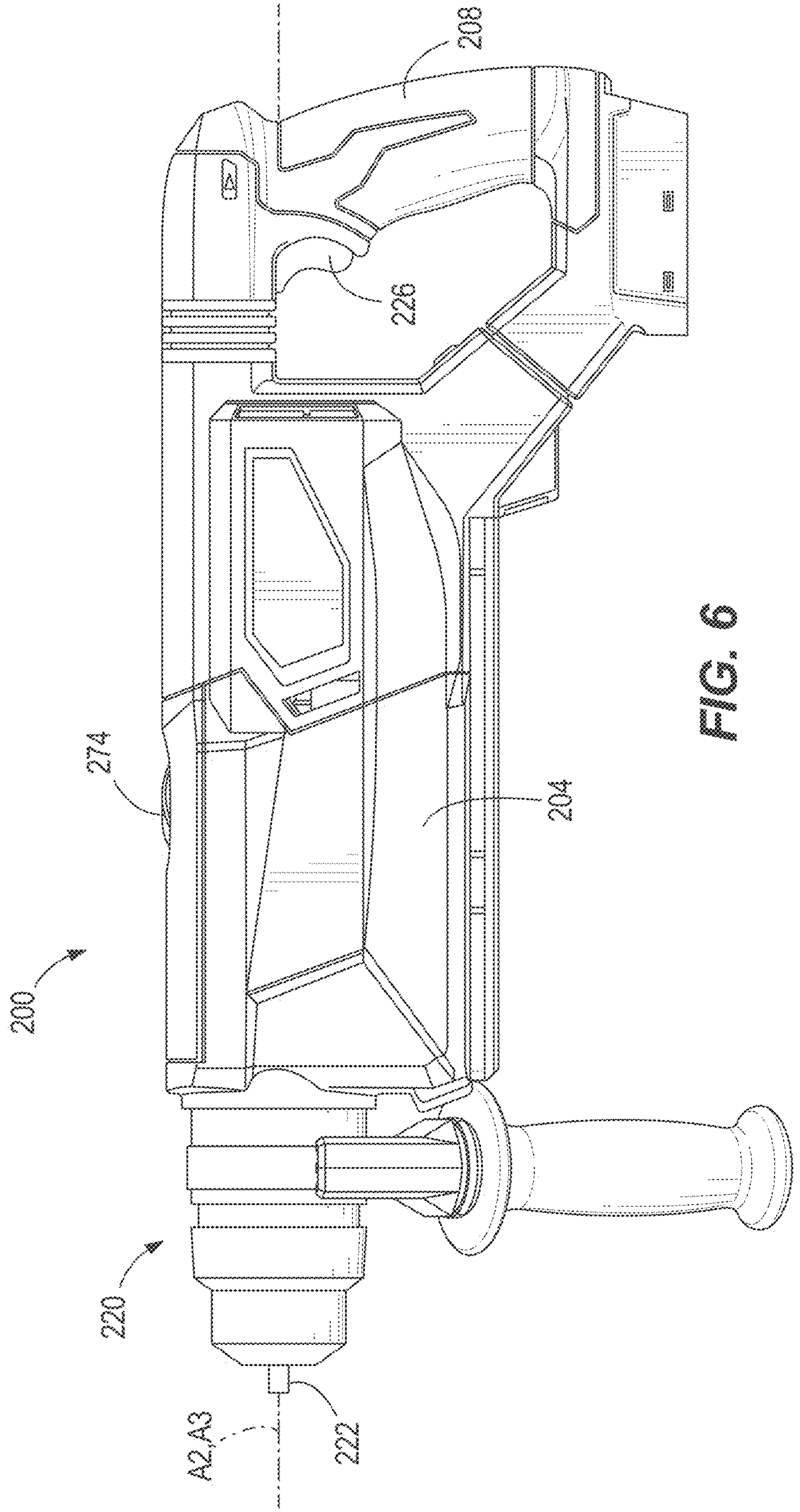
FIG. 6 is a plan view of an impact power tool.

In addition to the fastener driver 10, the piston 116 may also be used in an impact power tool, such as rotary hammer 200 of FIG. 6. The rotary hammer 200 includes a housing 204 having a D-shaped handle 208, a motor 212 disposed within the housing 204, and a rotatable spindle 216 coupled to the motor 212 for receiving torque from the motor 212. In the illustrated embodiment, the rotary hammer 200 includes a quick-release mechanism 220 coupled for co-rotation with the spindle 216 to facilitate quick removal and replacement of different tool bits. A tool bit 222 may include a necked section or a groove in which a detent member of the quick-release mechanism 220 is received to constrain axial movement of the tool bit 222 to the length of the necked section or groove. The rotary hammer 200 defines a tool bit reciprocation axis A2, which in the illustrated embodiment is coaxial with a rotational axis A3 of the spindle 216.

The motor 212 is configured as a brushless direct current (BLDC) motor that receives power from an on-board power source (e.g., a battery pack, not shown). Alternatively, the motor 212 may be powered by a remote power source (e.g., a household electrical outlet) through a power cord. The motor 212 is selectively activated by depressing an actuating member, such as a trigger 226, which in turn actuates an electrical switch for activating the motor 212.

Figure 7:
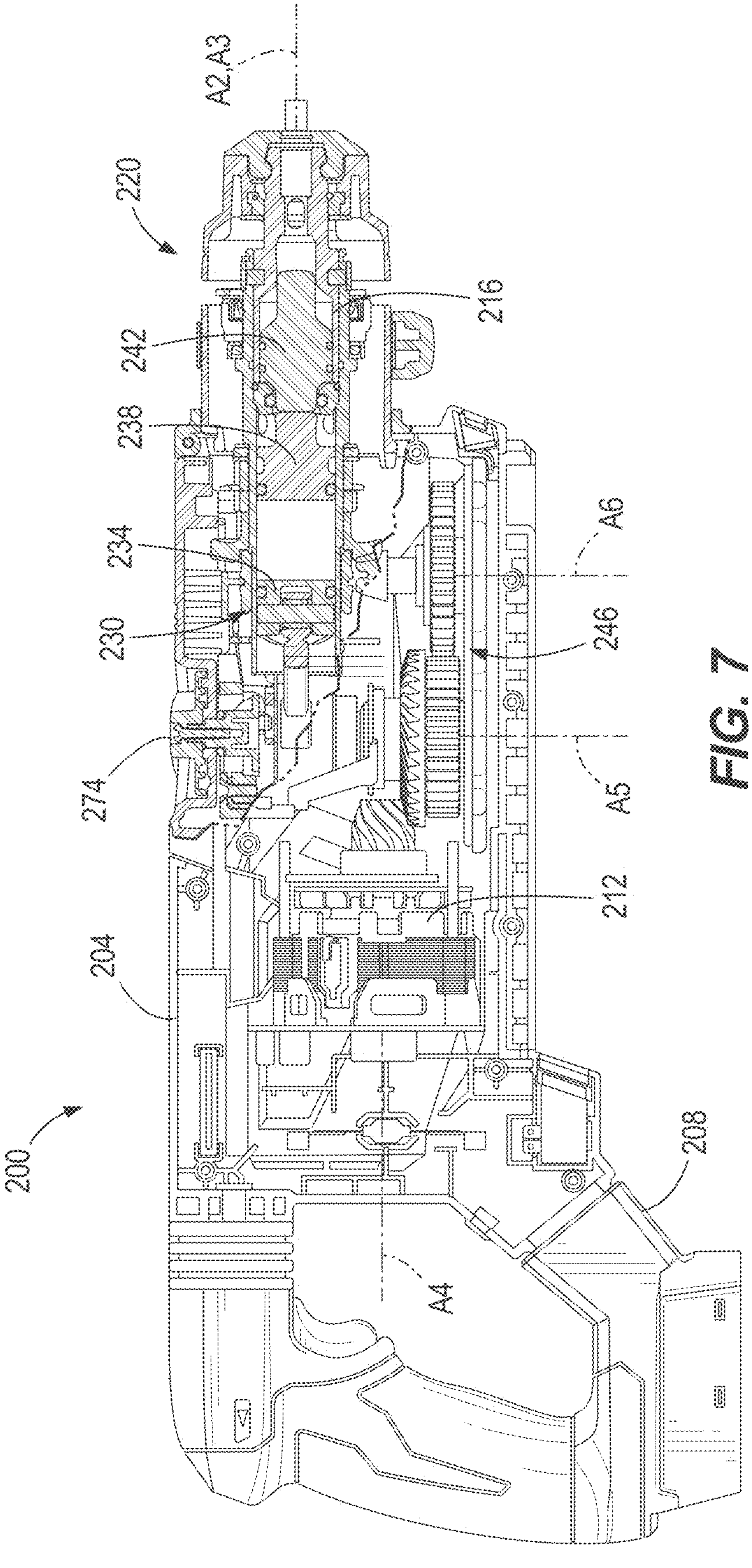
FIG. 7 is a cross-sectional view of the impact power tool of FIG. 6 with portions removed.

With reference to FIG. 7, the rotary hammer 200 further includes a reciprocating impact mechanism 230 having a reciprocating piston 234 disposed within the spindle 216, a striker 238 that is selectively reciprocable within the spindle 216 in response to a variable pressure air spring developed within the spindle 216 by reciprocation of the piston 234, and an anvil 242 that is impacted by the striker 238 when the striker 238 reciprocates toward the tool bit 222. The piston 234 reciprocates along the reciprocation axis A2 to induce the variable pressure air spring. The impact is then transferred from the anvil 242 to the tool bit 222. Torque from the motor 212 is transferred to the spindle 216 by a transmission 246. The piston 116 as illustrated in FIGS. 4-5B is compatible with the reciprocating impact mechanism 230 of the rotary hammer 200 such that the piston 116 can replace the reciprocating piston 234.

Figure 8:
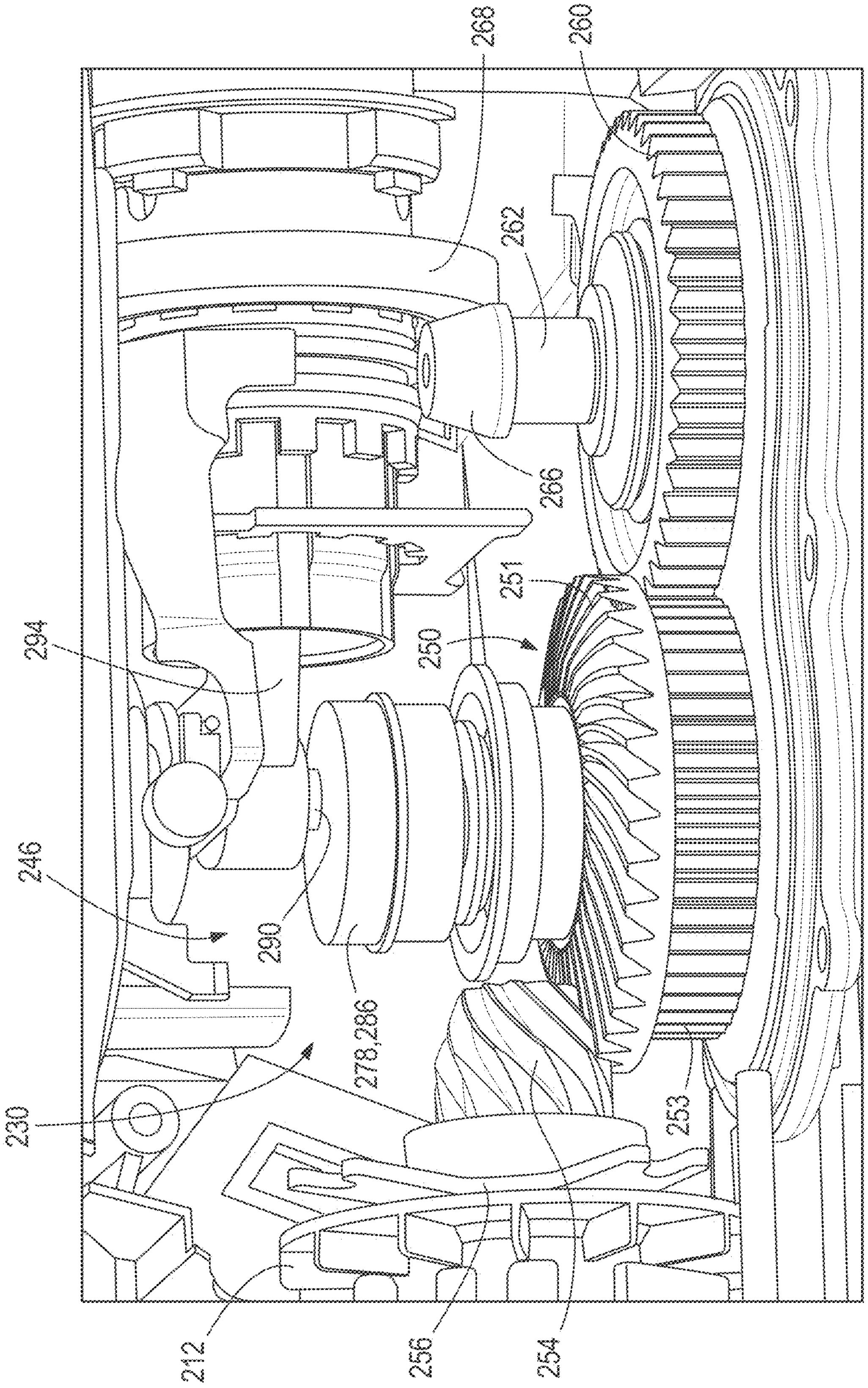
FIG. 8 is an enlarged perspective view of the impact power tool of FIG. 6 with portions removed.
Figure 9:
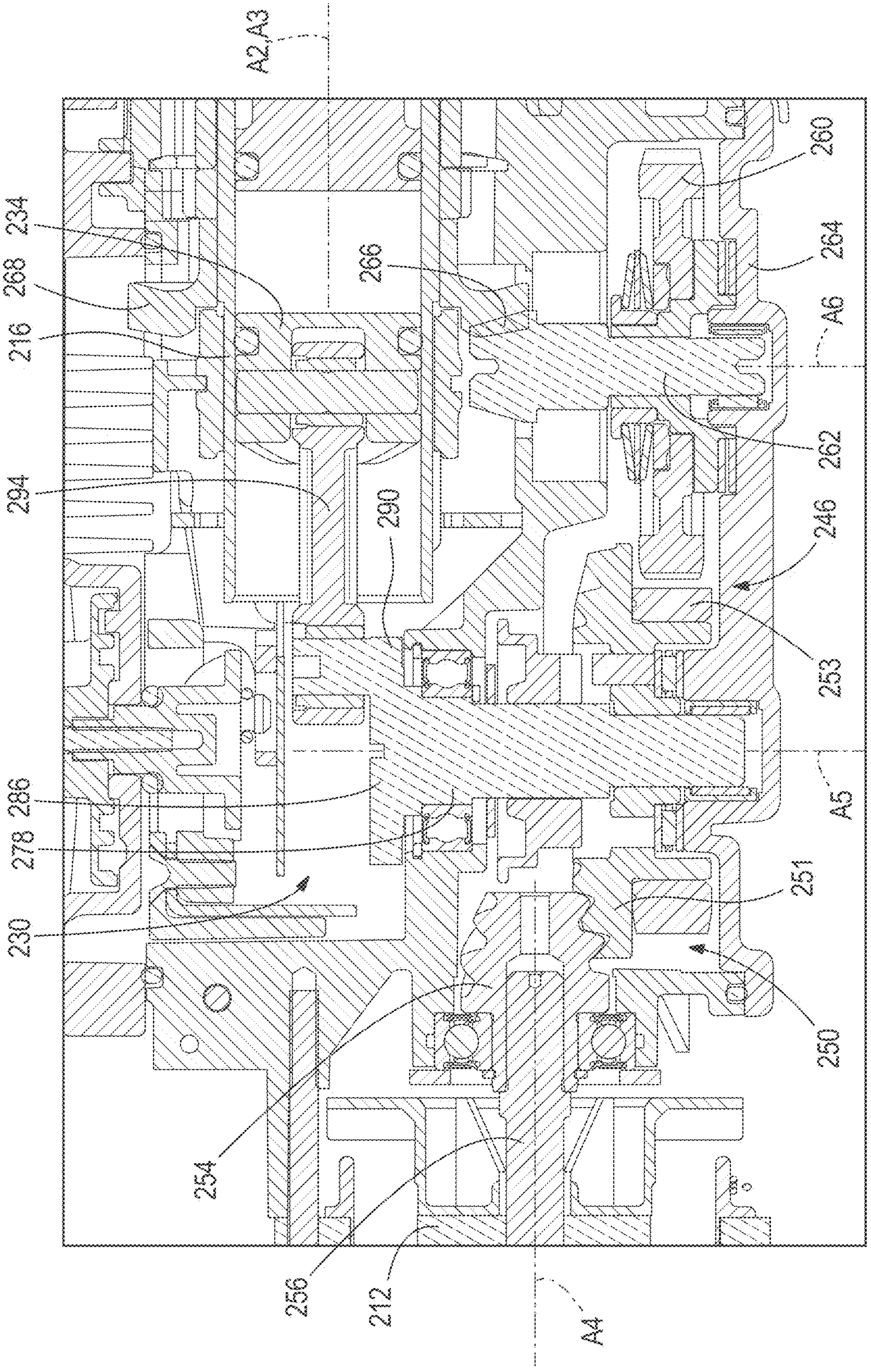
FIG. 9 is a cross-sectional view of a transmission of the impact power tool of FIG. 6.

With reference to FIGS. 8 and 9, the transmission 246 includes an input gear 250 having a bevel gear 251 and a first intermediate gear 253 disposed coaxially with the bevel gear 251 for co-rotation therewith. In some embodiments, the bevel gear 251 and the first intermediate gear 253 may be integral. The bevel gear 251 is engaged with a beveled pinion 254 on an output shaft 256 driven by the motor 212, which defines a motor axis A4 (FIG. 7). The motor axis A4 extends in the same direction as and is offset from the reciprocation axis A2 and the rotational axis A3 of the spindle 216. As such, motor axis A4 is parallel with the reciprocation axis A2 and the rotational axis A3 of the spindle 216. The first intermediate gear 253 is meshed with a second intermediate gear 260 on an intermediate shaft 262 that is supported by a gearcase 264 (FIGS. 7 and 8). The intermediate shaft 262 supports an intermediate pinion 266 that engages an output gear 268 coupled for co-rotation with the spindle 216. The output gear 268 is secured to the spindle 216 using a spline-fit or a key and keyway arrangement, for example, that facilitates axial movement of the spindle 216 relative to the output gear 268 yet prevents relative rotation between the spindle 216 and the output gear 268. In some embodiments, the transmission 246 may include a clutch that may limit the amount of torque transferred from the motor 212 to the spindle 216. In further embodiments, the clutch may disengage the transmission 246 from transferring rotation from the motor 212 to the spindle 216.

With reference back to FIGS. 6 and 7, the rotary hammer 200 includes a mode selection member 274 rotatable by an operator to switch between three modes. In a “hammer-drill” mode, the motor 212 is drivably coupled to the piston 234 for reciprocating the piston 234 while the spindle 216 rotates. In a “drill-only” mode, the piston 234 is decoupled from the motor 212 but the spindle 216 is rotated by the motor 212. In a “hammer-only” mode, the motor 212 is drivably coupled to the piston 234 for reciprocating the piston 234 but the spindle 216 does not rotate.

As shown in FIGS. 8 and 9, the impact mechanism 230 includes a crankshaft 278 that is rotatably supported within the gearcase 264 for co-rotation with the bevel gear 251 and the first intermediate gear 253. In other words, the bevel gear 251 is concentric with the crankshaft 278. The crankshaft 278 defines a crank axis A5 (FIG. 7) that is parallel with a rotational axis A6 of the intermediate shaft 262 and intermediate pinion 266. The crank axis A5 and the rotational axis A6 of the intermediate shaft 262 are perpendicular to the motor axis A4 and both the reciprocating axis and the rotational axis A2, A3 of the spindle 216. A bearing A32 (e.g., a roller bearing, a bushing, etc.) is supported by the gearcase 264 and rotatably supports the crankshaft 278. The crankshaft 278 includes a hub 286 with an eccentric pin 290 (FIG. 9). In the illustrated embodiment, the hub 286 and the eccentric pin 290 are integrally formed with the crankshaft 278. The crankshaft 278 is configured to covert continuous rotational motion from the motor 212 to reciprocating linear movement of the piston 234. The impact mechanism 230 further includes a connecting rod 294 interconnecting the piston 234 and the eccentric pin 290. In some embodiments, the impact power tool 200 may not include the transmission 246 to transfer rotation from the motor 212 to the spindle 216. In such an embodiment, the impact mechanism 230 would only be operable to impart an axial impact to a tool bit. For example, the impact power tool 200 tool may be a breaker that imparts axial impacts to a large tool bit to break up concrete and other similar workpieces.

Figure 10:
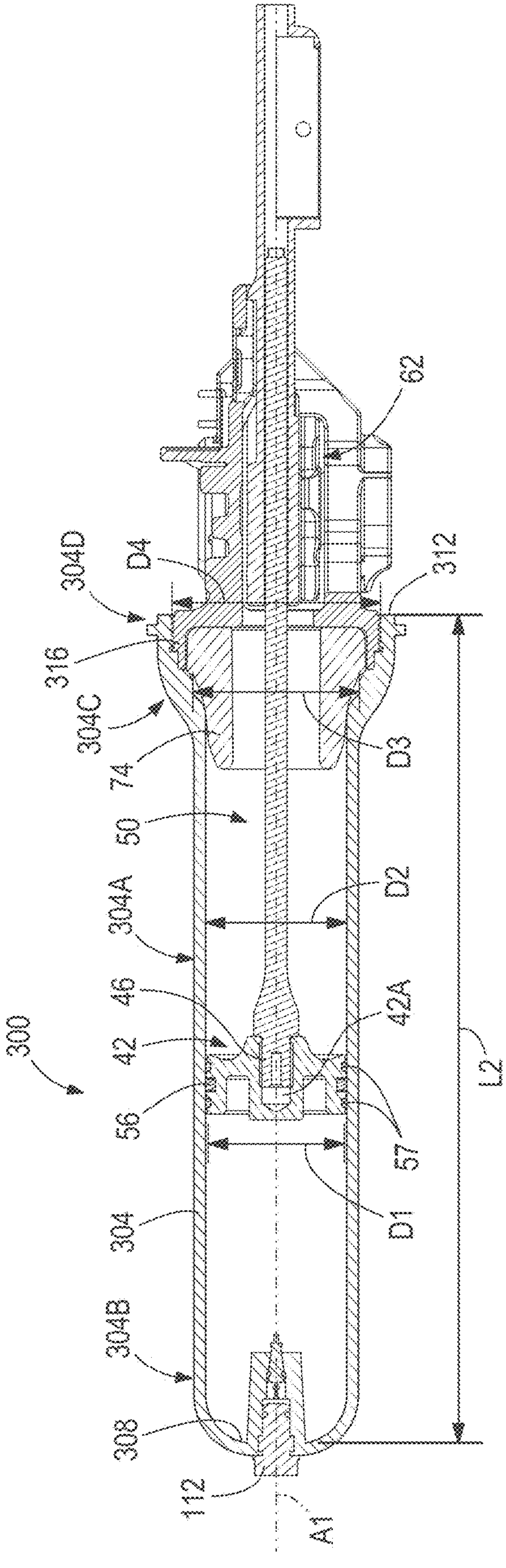
FIG. 10 is a cross-sectional view of a gas spring power mechanism, in accordance with an embodiment of the invention.

FIG. 10 illustrates a gas spring power mechanism that is compatible with the fastener driver 10 of FIGS. 1-3. The gas spring power mechanism of FIG. 9 is like the gas spring power mechanism as disclosed in FIGS. 2 and 3. Therefore, only differences between the gas spring power mechanisms will be discussed. The gas spring power mechanisms of FIG. 9 includes an elongated cylinder 300 having a single, monolithic body 304 with an inner diameter sized to accommodate a piston 42 with a diameter of 33 millimeters. In contrast to the elongated cylinder 100, the monolithic body 304 of the elongated cylinder 300 is formed for a single piece of material. In some constructions, the elongated cylinder 300 may be formed from two or more tubular components that are joined together in a post-manufacturing process (e.g., friction spin weld, etc.). The monolithic body 304 includes a driving portion 304A, a storage portion 304B, a frusto-conical portion 304C, and a cylindrical portion 304D. The gas spring power mechanism of FIG. 10 illustrates the piston 42 within the elongated cylinder 300; however, in some embodiments, the elongated piston 116 may be used instead and positioned within the elongated cylinder 300.

In one embodiment, a maximum diameter D1 of the piston 42 is measures less than approximately 44 millimeters (e.g., 1.73 inches). Thus, a total surface area of the piston 42 is less than approximately 1520 $mm^2$ (e.g., 2.35 $inches^2$). When the piston 42 has a diameter of less than 44 millimeters and a total surface area exposed to the compressed gas at an end of the monolithic body 304 of less than approximately 1520 $mm^2$, the pressure of the compressed gas necessary to move the piston 42 and the driver blade 50 from the TDC position to the BDC position with sufficient force to adequately drive the nail into the workpiece is at least 174 psi, which is greater than the pressure of conventional gas spring drivers when the piston is at the TDC position. When the piston 42 has a diameter of less than 43.2 millimeters (e.g., 1.7 inches) and a total surface area of less than approximately 1465 $mm^2$ (e.g., 2.27 $inches^2$), the pressure of the compressed gas necessary to move the piston 42 and the driver blade 50 from the TDC position to the BDC position with sufficient force to adequately drive the nail into the workpiece is at least 180 psi. In some embodiments, the piston 42 may have a diameter that measures approximately 43.2 millimeters (e.g., 1.7 inches, which correlates to a total surface area of 2.27 $inches^2$ and 1464.50 $mm^2$) to approximately 30.5 millimeters (e.g., 1.2 inches, which correlates to a total surface area of 1.13 $inches^2$ and 730 $mm^2$) in which case the pressure of the compressed gas necessary to move the piston 42 and the driver blade 50 from the TDC position to the BDC position with sufficient force to adequately drive the nail into the workpiece is between at least 180 psi and at least 360 psi. In some embodiments, the piston 42 may have a diameter that measures approximately 38.1 millimeters (e.g., 1.5 inches, which correlates to a total surface area of 1.77 $inches^2$ and 1140 $mm^2$) to approximately 31.8 millimeters (e.g., 1.25 inches, which correlates to a total surface area of 1.23 inches$^2$ and 794 mm$^2$) in which case the pressure of the compressed gas necessary to move the piston 42 and the driver blade 50 from the TDC position to the BDC position with sufficient force to adequately drive the nail into the workpiece is between at least 333 psi and at least 231 psi. In one embodiment, the piston 42 has a maximum diameter D1 of approximately 33 millimeters (e.g., 1.3 inches) and defines a total surface area of approximately 858 mm$^2$ (e.g., 1.32 inches$^2$) in which case the pressure of the compressed gas necessary to move the piston 42 and the driver blade 50 from the TDC position to the BDC position with sufficient force to adequately drive the nail into the workpiece is at least 308 psi. In another embodiment, the piston 42 has a maximum diameter D1 of approximately 33 millimeters (e.g., 1.3 inches) and defines a surface area of approximately 858 mm$^2$ (e.g., 1.32 inches$^2$) in which case the pressure of the compressed gas necessary to move the piston 42 and the driver blade 50 from the TDC position to the BDC position with sufficient force to adequately drive the nail into the workpiece is at least 308 psi to at least 345 psi. The term approximately as used herein means plus or minus 5% of the stated value.

With continued reference to FIG. 10, the monolithic body 304 is configured to guide the piston 42 and the driver blade 50 along the driving axis A1 to compress the gas in the monolithic body 304. The monolithic body 304 is therefore sized and shaped according to the size and shape of the piston 42. The monolithic body 304 includes a first end 308 and a second end 312 that is opposite the first end 308. A length L2 of the monolithic body 304 is defined between the first end 308 and the second end 312. The length L2 is approximately 280 mm. The frusto-conical portion 304C extends from the driving portion 304A to the cylindrical portion 304D, and the cylindrical portion 304D extends from the frusto-conical portion 304C to the second end 312. The driving portion 304A defines a substantially uniform inner diameter D2, the frusto-conical portion 304C defines an inner diameter D3 that increases from the driving portion 304A to the cylindrical portion 304D, and the cylindrical portion 304D defines a substantially uniform inner diameter D4. In the illustrated embodiment, the driving portion 304A defines an inner diameter D2 of approximately 1.2 inches (e.g., 30 mm) to approximately 1.7 inches (e.g., 44 mm). Preferably, the driving portion 304A defines an inner diameter D2 of less than approximately 1.3 inches (e.g., 33 mm). In the illustrated embodiment, the cylindrical portion 304D defines an inner diameter D4 of approximately 1.7 inches (e.g., 43 mm) to approximately 2.4 inches (e.g., 60 mm). Preferably, the cylindrical portion 304D defines an inner diameter D4 of less than approximately 2 inches (e.g., 50 mm). An inner diameter D3 of the frusto-conical portion 304C gradually increases to the cylindrical portion 304D. The second end 312 is closed by a portion of an inner frame 316, which supports the lifter 62.

Figure 11:
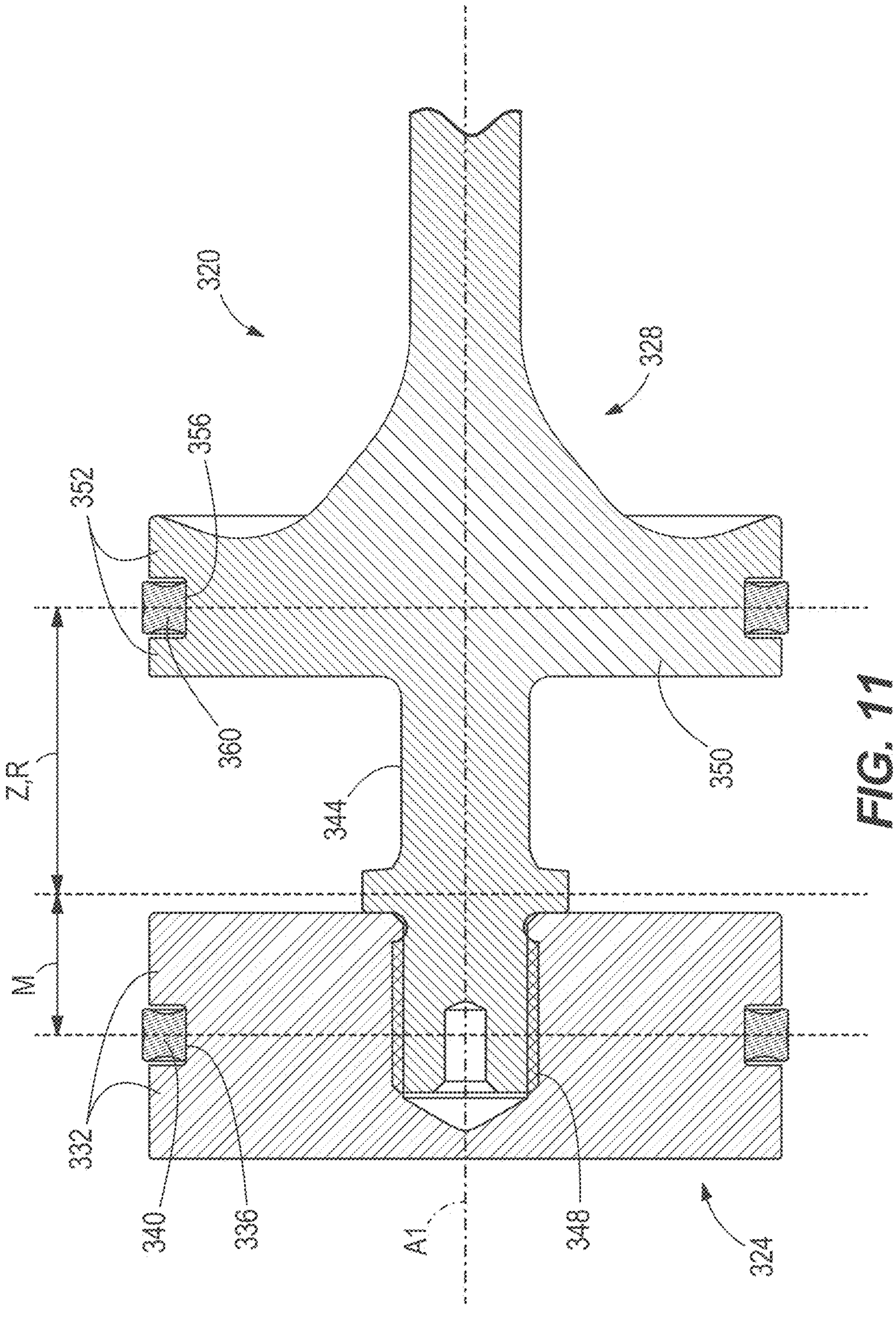
FIG. 11 is a simplified cross-sectional view of a driver mechanism for use with the powered fastener driver of FIG. 1.

FIG. 11 illustrates an embodiment of a driver assembly 320 that is not drawn to scale. The driver assembly 320 is compatible with the cylinders 38, 100, and 300. The driver assembly 320 includes a piston 324 and a driver blade 328 that is attached to the piston 324 for movement therewith. The piston 324 includes guide surfaces and/or rings 332 configured to center the piston 324 within a respective cylinder to ensure that the piston 324 reciprocates along the axis A1 between the TDC and BDC positions. In the illustrated embodiment, the guide surfaces and/or rings 332 define a recess 336 therebetween. A first seal 340 is received in a first location of the driver assembly 320 in the recess 336 of the piston 324. The driver blade 328 includes a central body 344 that is coupled to the piston 324 via threads 348. The central body 344 includes an enlarged, cylindrical portion 350 having guide surfaces and/or rings 352 configured to center the driver blade 328 within a respective cylinder to ensure that the driver blade 328 reciprocates along the axis A1 between the TDC and BDC positions. In the illustrated embodiment, the guide surfaces and/or rings 352 define a recess 356 therebetween. A second seal 360 is received in a second location of the driver assembly 320 in the recess 356 of the driver blade 328. Similar to the piston 116, the seals 340, 360 are separated by the stroke length Z and the margin M along the axis A1. As such, the seals 340, 360 do no do not axially overlap in the respective cylinder. Therefore, the seal 340 does not axially travel along the region R of the cylinder, where scratches may form, thus, reducing or preventing the likelihood that small leak paths develop between the seals 340, 360 and the cylinder. Although not illustrated in FIG. 11, the driver assembly 320 and the seals 340, 360 are revolved and symmetrical about the drive axis A1. In some embodiments, the seals 340, 360 are lubricated with an incompressible fluid (e.g., oil).

Although the invention has been described in detail with reference to certain preferred embodiments, variations and modifications exist within the scope and spirit of one or more independent aspects of the invention as described.

Various features of the invention are set forth in the following claims.

What is claimed is:

1. A powered fastener driver comprising:
- a housing defining a cylinder support portion and a motor housing portion;
- a cylinder within the cylinder support portion;
- a piston movable within the cylinder from a top-dead-center (TDC) position to a bottom-dead-center (BDC) position along a driving axis, thereby defining a stroke length measured from the TDC position to the BDC position on the driving axis;
- a driver blade attached to the piston for movement therewith along the driving axis from the TDC position toward the BDC position for driving a fastener into a workpiece; and
- a lifter operable to move the piston and driver blade, in unison, from the BDC position toward the TDC position,
- wherein the piston includes an axial length of at least the stroke length and includes a first seal and a second seal, and wherein the second seal is located at a distance of at least the stroke length from the first seal.

2. The powered fastener driver of claim 1, wherein the first seal is a quad ring.

3. The powered fastener driver of claim 1, wherein the distance between the second seal and the first seal along the driving axis is equal to the stroke length plus a margin.

4. The powered fastener driver of claim 3, wherein the first seal and the second seal include a seal width along the driving axis, and wherein the margin is at least equal to the seal width.

5. The powered fastener driver of claim 3, wherein the first seal and the second seal are axially flanked along the driving axis by respective first and second guide rings.

6. The powered fastener driver of claim 1, wherein the cylinder includes a length that is at least twice as long as the stroke length.

7. The powered fastener driver of claim 1, further comprising a fill valve coupled to the cylinder.

8. The powered fastener driver of claim 7, wherein the fill valve is coaxial with the driving axis.

9. The powered fastener driver of claim 1, wherein the piston has a diameter of less than 44 millimeters.

10. The powered fastener driver of claim 1, wherein a ratio of a length of the cylinder to a diameter of the piston is between 5.1:1 and 6.7:1.

11. The powered fastener driver of claim 1, wherein the cylinder includes a driving portion and a storage portion.

12. The powered fastener driver of claim 11, wherein the storage portion is disposed axially adjacent to the driving portion along the driving axis.

13. The powered fastener driver of claim 11, wherein the driving portion is a tubular component and the storage portion is a tubular component with a dome-shaped cap.

14. A powered fastener driver comprising:

a housing defining a cylinder support portion and a motor housing portion;

a cylinder within the cylinder support portion;

a driver assembly configured to drive a fastener into a workpiece, the driver assembly including:

a piston movable within the cylinder from a top-dead-center (TDC) position to a bottom-dead-center (BDC) position along a driving axis, thereby defining a stroke length measured from the TDC position to the BDC position on the driving axis, and a driver blade attached to the piston for movement therewith along the driving axis from the TDC position toward the BDC position for driving a fastener into a workpiece;

a lifter operable to move the driver assembly from the BDC position toward the TDC position;

a first seal coupled to a first location on the driver assembly; and a second seal coupled to a second location on the driver assembly, wherein the second seal is located at a distance of at least the stroke length from the first seal.

15. The powered fastener driver of claim 14, wherein the first seal is coupled to the piston and the second seal is coupled to the driver blade.

16. The powered fastener driver of claim 14, wherein each of the first seal and the second seal is flanked on each axial side by guide surfaces.

17. The powered fastener driver of claim 14, wherein the piston includes an axial length of at least the stroke length, and wherein both the first seal and the second seal are coupled to the piston.

18. The powered fastener driver of claim 17, wherein a diameter of the piston is between 33 millimeters and 44 millimeters.

19. An impact power tool adapted to impart axial impacts to a tool bit, the impact power tool comprising:

a housing;

a motor supported by the housing;

a spindle coupled to the motor for receiving torque from the motor to cause the spindle to rotate; and a reciprocating impact mechanism that is operable to create a variable pressure air spring within the spindle, the impact mechanism including:

a striker received within the spindle that reciprocates along a reciprocation axis in response to the variable pressure air spring, and a piston that reciprocates along the reciprocation axis to induce the variable pressure air spring, the piston movable within the spindle from a top-dead-center (TDC) position to a bottom-dead-center (BDC) position along the reciprocation axis, thereby defining a stroke length measured from the TDC position to the BDC position along the reciprocation axis, wherein the piston includes a first seal and a second seal, and wherein the second seal is located at a distance of at least the stroke length from the first seal.

20. The impact power tool of claim 19, wherein the impact mechanism includes a crankshaft configured to convert continuous rotational motion from the motor to reciprocating linear movement of the piston, the crankshaft defining a crank axis that is perpendicular to the reciprocation axis and the motor defining a motor axis that is parallel to the reciprocation axis.

* * * * *